United States Patent
Kitta et al.

(10) Patent No.: US 10,384,383 B2
(45) Date of Patent: Aug. 20, 2019

(54) MOVABLE PLATEN SUPPORT APPARATUS, MOVABLE PLATEN, MOLD OPENING/CLOSING APPARATUS AND MOLDING APPARATUS

(71) Applicant: TOSHIBA KIKAI KABUSHIKI KAISHA, Tokyo-To (JP)

(72) Inventors: Hideaki Kitta, Numazu (JP); Noriyuki Sasaki, Numazu (JP); Masato Kinoshita, Numazu (JP)

(73) Assignee: TOSHIBA KIKAI KABUSHIKI KAISHA, Tokyo-To (JP)

( * ) Notice: Subject to any disclaimer, the term of this patent is extended or adjusted under 35 U.S.C. 154(b) by 241 days.

(21) Appl. No.: 15/505,800

(22) PCT Filed: Aug. 25, 2015

(86) PCT No.: PCT/JP2015/073848
§ 371 (c)(1),
(2) Date: Feb. 22, 2017

(87) PCT Pub. No.: WO2016/031812
PCT Pub. Date: Mar. 3, 2016

(65) Prior Publication Data
US 2017/0274569 A1    Sep. 28, 2017

(30) Foreign Application Priority Data
Aug. 26, 2014  (JP) ................. 2014-171789

(51) Int. Cl.
*B29C 45/17* (2006.01)
*B22D 17/26* (2006.01)
*B29C 45/66* (2006.01)

(52) U.S. Cl.
CPC ........ *B29C 45/1744* (2013.01); *B22D 17/263* (2013.01); *B29C 45/1761* (2013.01); *B29C 45/661* (2013.01); *B22D 17/26* (2013.01)

(58) Field of Classification Search
CPC .. B29C 45/1744; B29C 45/1761; B22D 17/26
See application file for complete search history.

(56) References Cited

U.S. PATENT DOCUMENTS

| | | | |
|---|---|---|---|
| 4,929,166 A | 5/1990 | DiSimone et al. | |
| 5,192,557 A * | 3/1993 | Hirata | B29C 45/1761 425/450.1 |
| 2015/0099030 A1 | 4/2015 | Kirihata | |

FOREIGN PATENT DOCUMENTS

| | | |
|---|---|---|
| DE | 44 24 109 | 1/1995 |
| EP | 0 666 160 | 8/1995 |

(Continued)

OTHER PUBLICATIONS

International Search Report (with English Translation) issued in PCT/JP2015/0733848 dated Nov. 2, 2015.

(Continued)

*Primary Examiner* — James P Mackey
(74) *Attorney, Agent, or Firm* — DLA Piper LLP US

(57) ABSTRACT

The present invention provides a movable platen support apparatus which, with a linear guide having a minimum necessary load rating, can secure a sufficient traveling life of the linear guide and, in addition, can secure the rigidity of the linear guide which is necessary and sufficient taking into consideration a moment that acts on a movable platen. A movable platen support apparatus 40 according to the present invention includes a guide mechanism which movably engages a rail 41 extending on a frame 11 in the direction of movement of a movable platen 16, to which a movable mold 19 is to be mounted, and which movably supports the movable platen 16. The guide mechanism includes a linear guide 42 composed of blocks 42a to 42d arranged in a line, in which at least one of the blocks 42a to 42d, e.g. the blocks 42b, 42c, has a load rating which differs from the load rating(s) of the other block(s), e.g. the blocks 42a, 42d.

8 Claims, 2 Drawing Sheets

(56) References Cited

FOREIGN PATENT DOCUMENTS

| JP | 2003-071894 | 3/2003 |
| JP | 2009-101529 | 5/2009 |
| JP | 2009-125933 | 6/2009 |
| JP | 2009-262514 | 11/2009 |
| JP | 2015-071278 | 4/2015 |

OTHER PUBLICATIONS

Written Opinion issued in PCT/ JP2015/0733848 dated Nov. 2, 2015.
English Language Abstract and Translation of JP 2003-071894 published Mar. 12, 2003.
English Language Abstract and Translation of JP 2009-125933 published Jun. 11, 2009.
English Language Abstract and Translation of JP 2009-262514 published Nov. 12, 2009.
English Language Abstract and Translation of JP 2009-101529 published May 14, 2009.
English Language Abstract and Translation of JP 2015-071278 published Apr. 16, 2015.
International Preliminary Report on Patentability issued in PCT/ JP2015/0733848 dated Feb. 28, 2017.
Written Opinion (English Translation) issued in PCT/ JP2015/ 0733848 dated Nov. 2, 2015.
Office Action in German Patent Application No. 112015003890.6 dated Feb. 8, 2019.

* cited by examiner

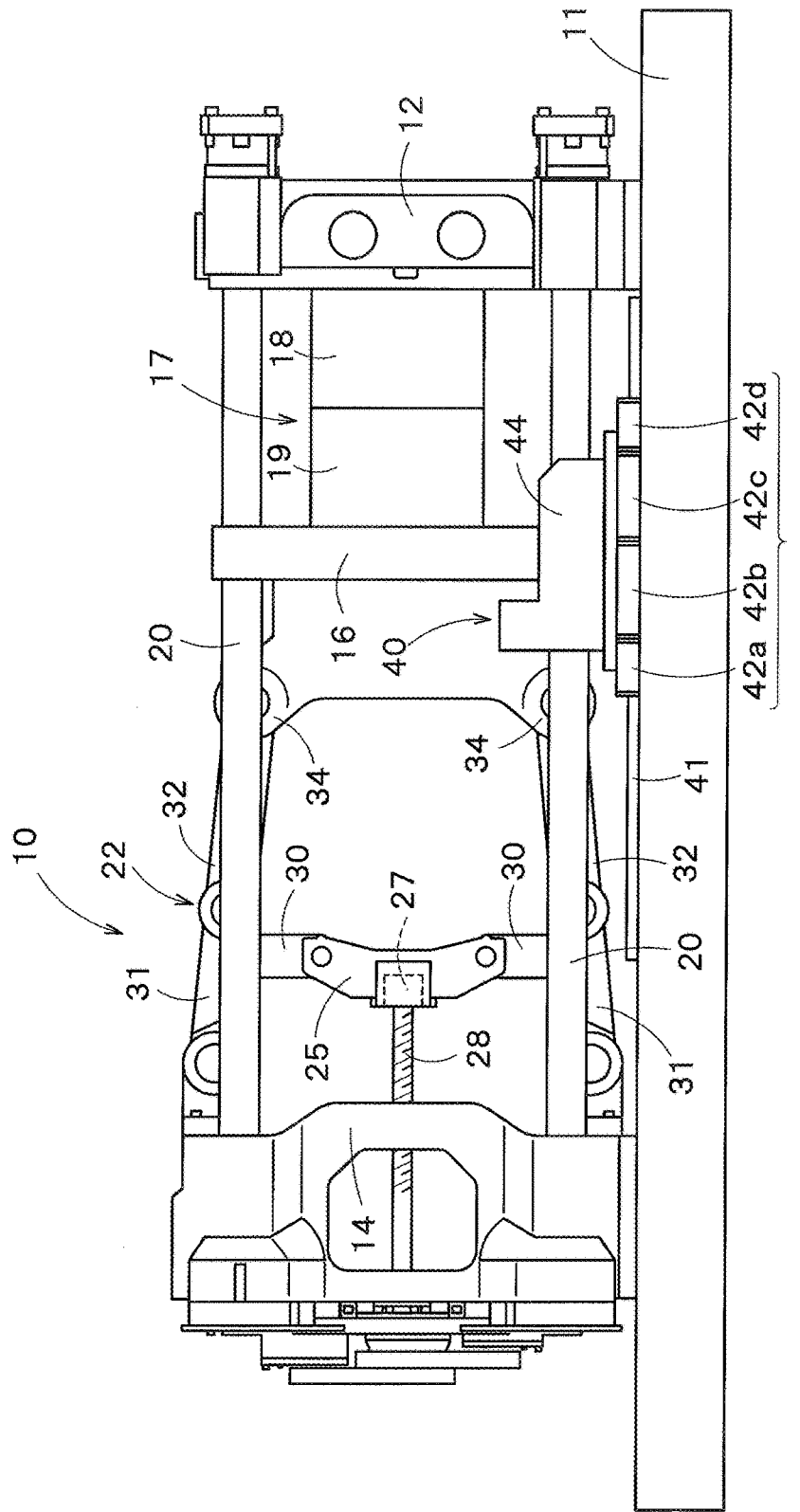
F I G. 1

MOVABLE PLATEN SUPPORT APPARATUS, MOVABLE PLATEN, MOLD OPENING/CLOSING APPARATUS AND MOLDING APPARATUS

CROSS REFERENCE TO RELATED APPLICATIONS

This application is a U.S. National Stage Application of International Application No. PCT/JP2015/073848 filed Aug. 25, 2015, which claims priority from Japanese Patent Application No. 2014-171789 filed Aug. 26, 2014. The entirety of all the above-listed applications are incorporated herein by reference.

TECHNICAL FIELD

Embodiments of the present invention relate to a movable platen support apparatus for supporting a movable platen and guiding movement of the movable platen e.g. in a mold clamping apparatus in a molding apparatus, such as an injection molding machine.

BACKGROUND ART

Molding apparatuses, such as injection molding machines and die-cast machines, comprise a mold clamping apparatus in which a mold, consisting of a fixed mold and a movable mold, is to be mounted, and an injection apparatus. The mold clamping apparatus includes a fixed platen to which the fixed mold is to be mounted, and a movable platen to which the movable mold is to be mounted. There are various types of known mold clamping apparatuses. A typical one is a toggle-type mold clamping apparatus which moves a movable platen back and forth along tie bars through extension/contraction of a power-driven toggle link mechanism, thereby closing, clamping and opening a mold.

In such a mold clamping apparatus, the movable platen is supported on a frame of the molding apparatus via a platen support apparatus so that the movable platen can smoothly move back and forth along tie bars. When a movable mold is mounted on the movable platen, a large load is applied to the tie bars, whereby the tie bars can sometimes slightly bend downward. The amount of downward bend of the tie bars changes with a change in the weight of the mounted movable mold upon mold replacement.

In order to prevent such bend of tie bars, Japanese Patent Laid-Open Publication No. 2003-71894, for example, describes using a linear guide that slides along a guide rail as a platen support apparatus to support the weight of a movable platen. This can eliminate application of a load on the tie bars, thereby making it possible to ensure smooth back-and-forth movement of the movable platen and to prevent bending of the tie bars.

Further, in order to prevent the generation of a bending moment in the movable platen that receives a large force from a toggle link mechanism upon clamping of a mold, it is proposed in the above-cited patent document to fix the linear guide via a mounting block which is elastically mounted to the lower end of the movable platen.

SUMMARY OF THE INVENTION

However, when a movable mold is mounted on a movable platen, due to the weight of the movable mold, a moment acts on the movable platen in the platen-falling direction. This moment is not taken into account in the conventional platen support apparatus which supports a movable platen by using a linear guide. Therefore, when the rigidity of the linear guide is insufficient, the traveling life of the linear guide will be shortened by the action of the moment.

A linear guide is continually subjected to the load of a movable platen; therefore, in view of the traveling life, it is preferred to use an expensive linear guide having a high load rating. In the conventional platen support apparatus, however, a plurality of linear guides having the same specifications are disposed on a guide rail despite the fact that the loads applied to the linear guides are not the same. This is not preferred from a cost-effectiveness standpoint for an extension of the traveling lives of the linear guides.

The present invention has been made in view of the above problems in the prior art. It is therefore an object of the present invention to provide a movable platen support apparatus, a movable platen, a mold opening/closing apparatus and a molding apparatus which, with a linear guide having a minimum necessary load rating, can secure a sufficient traveling life of the linear guide and, in addition, can secure the rigidity of the linear guide which is necessary and sufficient taking into consideration a moment that acts on a movable platen.

Means for Solving the Problems

In order to achieve the object, a movable platen support apparatus according to the present invention comprises a guide mechanism which engages a rail extending on a frame in the direction of movement of a movable platen, to which a movable mold is to be mounted, and which movably supports the movable platen, wherein the guide mechanism includes a linear guide composed of a plurality of blocks arranged in a line, and wherein at least one of the plurality of blocks, constituting the linear guide, has a load rating which differs from the load rating(s) of the other block(s).

A movable platen according to the present invention comprises: a movable platen to which a movable mold is to be mounted; and the above-described movable platen support apparatus including the guide mechanism which engages a rail extending on a frame in the direction of movement of the movable platen, to which a movable mold is to be mounted, and which supports the movable platen.

A mold opening/closing apparatus according to the present invention comprises: a fixed platen to which a fixed mold is to be mounted; a movable platen to which a movable mold is to be mounted; an opening/closing mechanism for opening/closing a mold; and the above-described movable platen support apparatus.

A molding apparatus according to the present invention comprises the above-described opening/closing apparatus.

BRIEF DESCRIPTION OF THE DRAWINGS

FIG. 1 is a side view of a mold clamping apparatus to which a movable platen support apparatus according to an embodiment of the present invention is applied;

DESCRIPTION OF EMBODIMENTS

Figure 2:
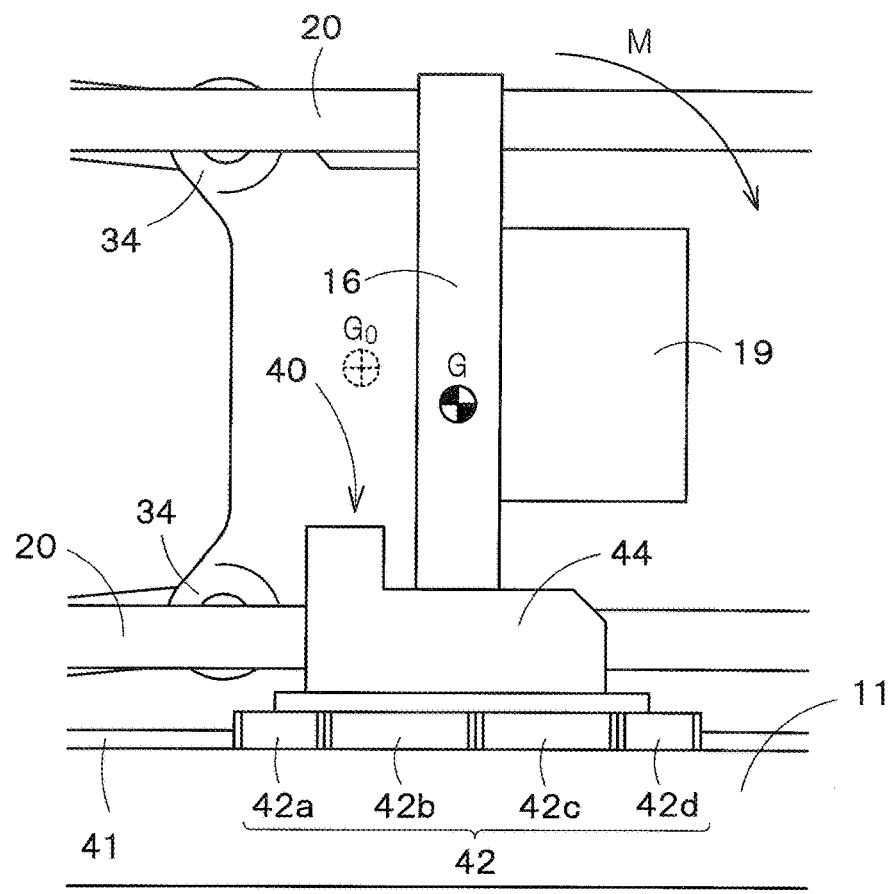
FIG. 2 is a side view of the movable platen of FIG. 1.

Embodiments of the movable platen support apparatus, the movable platen, the mold opening/closing apparatus and the molding apparatus according to the present invention will now be described with reference to the drawings.

FIG. 1 shows a mold clamping apparatus for use in an injection molding machine (molding apparatus), to which the present invention is applied. In FIG. 1, reference numeral 10 denotes the entire mold clamping apparatus.

The mold clamping apparatus (opening/closing apparatus, mold opening/closing apparatus) 10 includes, for example, a fixed platen 12 fixed on the anterior side of a frame 11, a link housing (pressure-receiving plate) 14 installed on the posterior side of the frame 11, and a movable platen 16 movably installed between the fixed platen 12 and the link housing 14. Reference numeral 17 denotes a mold. A fixed mold (the other mold, one mold) 18 is mounted to the fixed platen 12, while a movable mold (one mold, the other mold) 19, disposed opposite the fixed mold 18, is mounted to the movable platen 16.

The fixed platen 12 and the link housing 14 are connected by a plurality of (e.g. four) tie bars 20. The movable platen 16 moves back and forth along the below-described guide rails 41.

In this embodiment the mold clamping apparatus 10 is configured as a toggle-type mold clamping apparatus which generates a mold clamping force with a toggle link mechanism 22.

In FIG. 1, reference numeral 25 denotes a crosshead. The crosshead 25, at its center, has a nut member 27 that constitutes a ball screw mechanism for driving the toggle link mechanism 22. The nut member 27 is configured to engage a ball screw 28. The ball screw (drive mechanism) 28 is driven by a not-shown servo motor (drive section).

The toggle link mechanism (opening/closing mechanism) 22 includes a pair of upper and lower toggle links. Each toggle link includes links 30, 31 and 32. In each toggle link, one end of the link 30 is connected to the crosshead 25, one end of the link 31 is connected to the link housing 14, and one end of the link 32 is connected to a toggle link joint 34 located behind the movable platen 16. Such toggle link mechanism 22 moves the movable platen 16 back and forth and transmits a mold clamping force to the movable platen 16. Thus, the movable platen 16 is moved back and forth by the not-shown servo motor (drive device, drive unit).

The mold clamping apparatus 10 of this embodiment is provided with the following movable platen support apparatus 40 in order to support the weight of the movable platen 16 and achieve smooth movement of the movable platen 16.

A pair of guide rails (rails) 41 is laid on both sides of the base 11 and parallel to the tie bars 20. Linear guide blocks (guide blocks, blocks) 42a to 42d, as a linear guide (guide, guide mechanism) 42 which movably engages each guide rail 41, are mounted via a mounting block 44 to a lower portion of the movable platen 16 on either side of the movable platen 16.

In this embodiment the four linear guide blocks 42a to 42d, for example, are connected in the length direction on each guide rail 41, thereby constituting the linear guide 42. The guide rail 41 is a known guide rail having a generally I-shaped cross section. A linear bearing (linear rolling motion guide bearing), having rollers or steel balls which roll on the rolling surface of the guide rail 41, is used as each of the linear guide blocks 42a to 42d. A linear bearing which slides on the sliding surface of the guide rail 41 via a lubricating oil can also be used.

As shown in FIG. 2, a combination of linear bearings having different load ratings is used for the linear guide blocks 42a to 42d. In this embodiment the front linear guide block 42d and the rear linear guide block 42a are linear guide blocks having a low load rating (relatively low load rating), while the intermediate linear guide blocks 42b, 42c are linear guide blocks having a high load rating (relatively high load rating). In FIG. 2, G represents the center of gravity as observed when the movable mold 19 is mounted on the movable platen 16, and $G_0$ represents the position of the center of gravity as observed when the movable mold 19 is not mounted on the movable platen 16.

An optimal combination of the linear guide blocks 42a to 42d may be determined based on the distribution of load application (static load and dynamic load, including a force generated by a bending moment) in the arrangement direction of the blocks, produced when the movable mold 19 having the maximum mountable weight is mounted on the movable platen 16.

Figure 3:
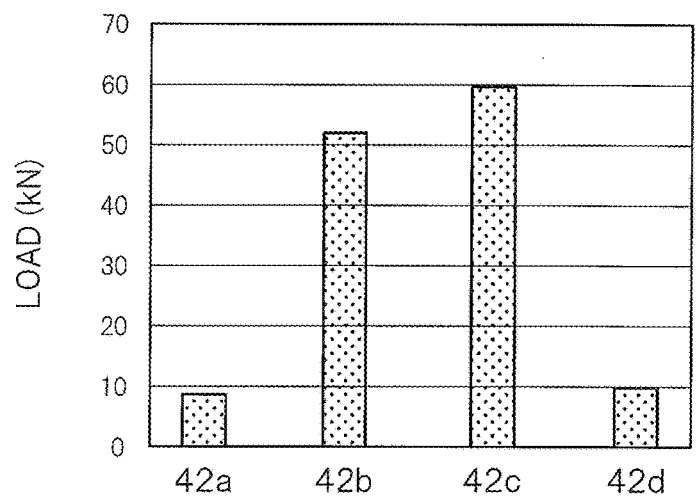
FIG. 3 is a diagram showing a relationship between a static load distribution as observed when a mold is mounted on a movable platen and an arrangement of guide blocks in a linear guide apparatus.

FIG. 3 is a diagram showing a relationship between the linear guide blocks 42a to 42d and a static load distribution as observed when the movable mold 19 having the maximum weight is mounted on the movable platen 16.

As shown in FIG. 3, when the movable mold 19 is mounted on the movable platen 16, a large load acts on the linear guide blocks 42b, 42c located near the center of gravity G, whereas a far smaller load acts on the linear guide blocks 42a, 42d located distant from the center of gravity G.

Accordingly, linear bearings having a load rating high enough to support an expected load are used as the linear guide blocks 42b, 42c. Thus, linear guide blocks having a higher load rating than the linear guide blocks 42a, 42d are used as the linear guide blocks 42b, 42c. In contrast, linear bearings having a load rating sufficient to support a minimum necessary load are used as the linear guide blocks 42a, 42d. Thus, linear guide blocks having a lower load rating than the linear guide blocks 42b, 42c are used as the linear guide blocks 42a, 42d.

The above-described movable platen support apparatus 40 has the following function and effects.

Referring to FIG. 2, when the movable mold 19 is mounted on the movable platen 16, a bending moment M acts on the movable platen 16 in the platen-toppling direction due to the weight of the movable mold 19, and a force generated by the bending moment M is applied to the linear guide blocks 42a to 42d supporting the movable platen 16.

To provide the linear guide 42 with a sufficient rigidity to resist the bending moment M, linear guide blocks having a high load rating are used as the linear guide blocks 42b, 42c which, of the four linear guide blocks 42a to 42d, are most affected by the bending moment M. This can prevent the linear guide 42 from being damaged due to insufficient rigidity, thus preventing shortening of the durable life of the linear guide 42.

Further, linear guide blocks having a high load rating are used as the linear guide blocks 42b, 42c to which a large load is applied when the movable platen 16 moves upon opening or closing of the mold, while linear guide blocks having a low load rating are used as the linear guide blocks 42a, 42d to which a relatively small load is applied. This makes it possible for each of the linear guide blocks 42a to 42d to bear an applied load commensurate with the load rating of the linear guide block. Thus, this can avoid over-performance of each of the linear guide blocks 42a to 42d and reduce the overall production cost, and yet can prevent wear of the linear guide blocks 42a to 42d, thereby securing a long-term traveling life thereof.

As described hereinabove, the movable platen support apparatus 40 of this embodiment, with bearings each having a minimum necessary load rating, can secure the rigidity of the linear guide 42 which is necessary and sufficient taking into consideration a bending moment that acts on the movable platen 16 and, in addition, can secure a sufficient traveling life of the linear guide 42.

While the movable platen support apparatus according to the present invention has been described with reference to the embodiment in which the present invention is applied to a mold clamping apparatus for use in an injection molding machine, the present invention can also be applied to a mold clamping apparatus for use in other type of molding apparatus such as a die-cast machine, a transfer molding machine, a press molding machine, etc.

In the above-described embodiment the movable platen and the movable platen support apparatus are taken as distinct and separate structures. However, the movable platen support apparatus of the above-described embodiment may be taken as a part of a movable platen, and the present invention may be applied to that movable platen. Thus, in that case, the movable platen is composed of the movable platen 16 of the above-described embodiment as a body portion, and the movable platen support apparatus 40 of the above-described embodiment as a body portion support apparatus. The present invention is applied to the body portion support apparatus.

Though in the above-described embodiment the four blocks, two of which have a load rating different from that of the other two, constitute one linear guide mechanism, the present invention is not limited to this feature. For example, it is possible to use four blocks having different load ratings. Further, it is possible to use 2, 3, 5 or more blocks in one linear guide mechanism. Thus, the present invention can be applied to a linear guide mechanism composed of a plurality of blocks.

The "load rating" herein refers to static load rating when the guide mechanism is stationary, i.e. when the movable platen is stationary, and refers to dynamic load rating when the guide mechanism is moving (in operation), i.e. when the movable platen is moving.

The invention claimed is:

1. A movable platen support apparatus comprising a guide mechanism which engages a rail extending on a frame in the direction of movement of a movable platen, to which a movable mold is to be mounted, and which movably supports the movable platen,
    wherein the guide mechanism includes a linear guide composed of a plurality of blocks arranged in a line, and wherein at least one of the plurality of blocks, constituting the linear guide, has a load rating which differs from the load rating(s) of the other block(s).

2. The movable platen support apparatus according to claim 1, wherein the blocks of the linear guide have load ratings having a distribution commensurate with a distribution of loads, applied to the blocks from the movable platen with the movable mold mounted thereon, in an arrangement direction of the blocks, and wherein each block bears an applied load commensurate with the load rating of the block.

3. The movable platen support apparatus according to claim 1, wherein a linear rolling motion guide bearing is used as each of the blocks of the linear guide.

4. The movable platen support apparatus according to claim 2, wherein a linear rolling motion guide bearing is used as each of the blocks of the linear guide.

5. A mold opening/closing apparatus comprising:
    a fixed platen to which a fixed mold is to be mounted;
    a movable platen to which a movable mold is to be mounted;
    an opening/closing mechanism for opening/closing the fixed mold and the movable mold; and
    the movable platen support apparatus according to claim 1.

6. A molding apparatus comprising the mold opening/closing apparatus according to claim 5.

7. A mold opening/closing apparatus comprising:
    a fixed platen to which a fixed mold is to be mounted;
    a movable platen to which a movable mold is to be mounted;
    an opening/closing mechanism for opening/closing the fixed mold and the movable mold; and
    the movable platen support apparatus according to claim 2.

8. A molding apparatus comprising the mold opening/closing apparatus according to claim 7.

* * * * *